Figure 1:
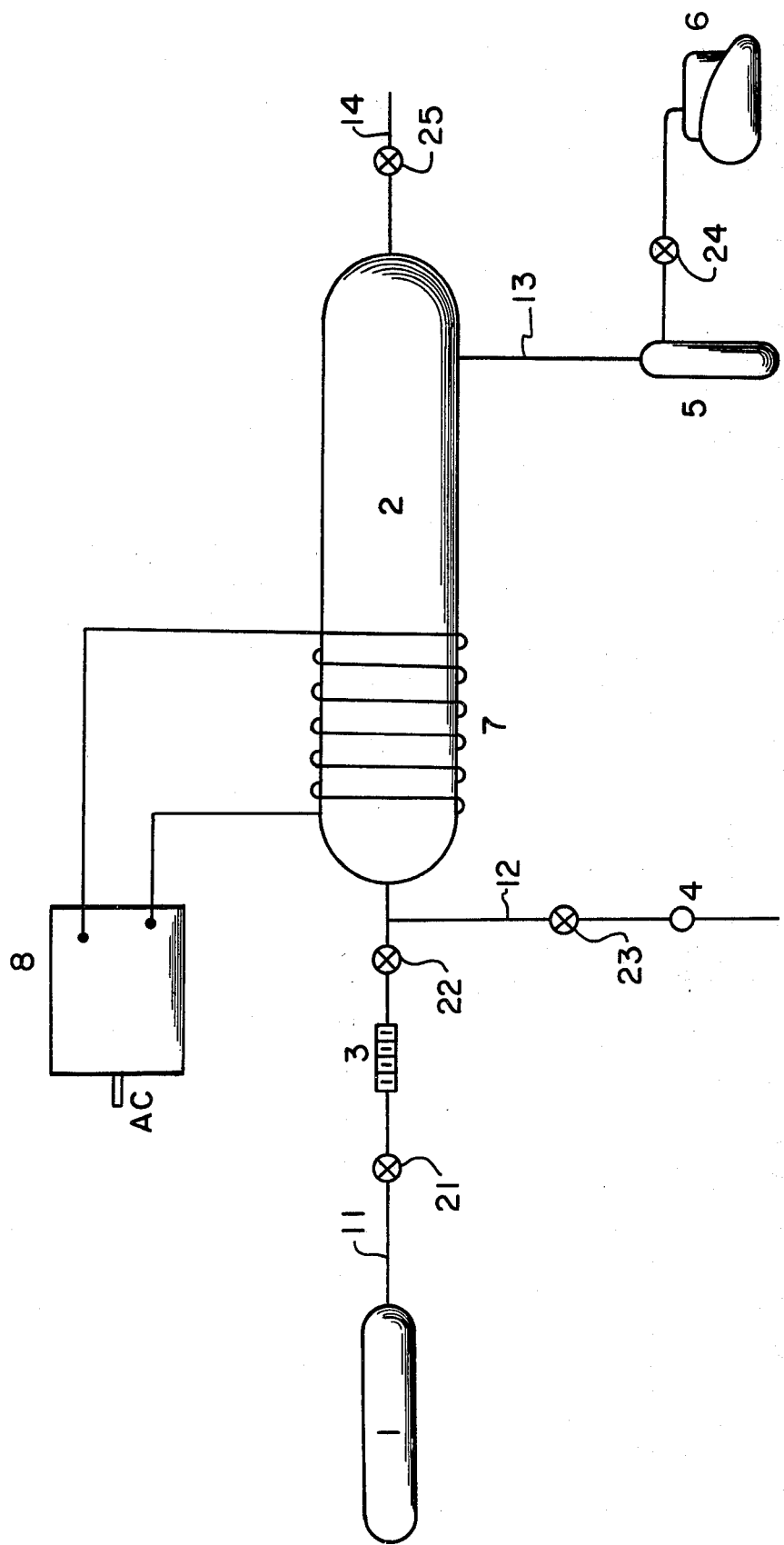

United States Patent [19]

Blenner et al.

[11] 4,349,403
[45] Sep. 14, 1982

[54] METHOD FOR BONDING ELASTOMERS TO STEEL

[75] Inventors: Donald R. Blenner; Herman V. Boenig, both of Erie, Pa.

[73] Assignee: Lord Corporation, Erie, Pa.

[21] Appl. No.: 225,488

[22] Filed: Jan. 16, 1981

[51] Int. Cl.³ .................. B05D 3/00; B05D 3/04
[52] U.S. Cl. .................. 156/272.6; 156/110 A; 427/39; 427/327; 204/164; 204/165
[58] Field of Search .................. 156/307.5, 307.7, 315, 156/124, 272, 110 A, 272.6; 204/164, 165, 192 E, 192 EL; 427/327, 388.1, 399, 409, 39, 41; 152/359; 146/6.35, 31.5; 428/469

[56] References Cited

U.S. PATENT DOCUMENTS 3,730,863  5/1973  Keller .................. 204/164
3,871,980  3/1975  Butcher .................. 204/164
4,211,824  7/1980  Yoshida .................. 428/469

FOREIGN PATENT DOCUMENTS 55-18548  5/1980  Japan .................. 428/412

OTHER PUBLICATIONS

Bersin, Richard L., How to Obtain Strong Adhesive Bonds Via Plasma Treatment, *Adhesives Age*, Mar. 1972, pp. 37–40.

*Primary Examiner*—Edward C. Kimlin
*Assistant Examiner*—F. K. Wine
*Attorney, Agent, or Firm*—John A. Gazewood

[57] ABSTRACT

Adhesion and environmental resistance of rubber-metal assemblies is significantly improved by the use of metal substrates which have been nitrided at least in the bond area and subsequently exposed to a non-reactive gas, such as argon, prior to applying the adhesive.

10 Claims, 1 Drawing Figure

METHOD FOR BONDING ELASTOMERS TO STEEL

This invention relates to bonding of elastomeric compositions. More particularly, the invention is concerned with methods for bonding natural and synthetic elastomers to metal substrates and to the resulting composite structures.

Laminates and composite structures wherein natural and synthetic elastomers are adhesively bonded to metal substrates, especially in application areas wherein severe environmental conditions are expected, are well-known in the art. There are any number of adhesive compositions which can be effective to afford rubber-tearing bonds, the desired failure condition of rubber-metal bonded assemblies, providing the metal surfaces, in particular, have been adequately prepared for bonding, as by degreasing, rinsing and sand-blasting. While a number of adhesive compositions can provide at least moderate levels of environmental protection in aggressive environments such as humid, saline and other corrosive conditions, by far the majority of known adhesives are subject to failure under such conditions. The use of metal primers in combination with the adhesive composition is effective in many instances to improve adhesive performance under such adverse conditions. Environmental resistance can be further improved by the use of treated metal elements in combination with the metal primer-rubber adhesive bonding systems. A well-known treatment for improving corrosion resistance of ferrous-based metals is the use of phosphate conversion coatings. Such coatings are conventionally used to serve as a base for organic coatings to aid in cold forming, to improve wear resistance, and to provide corrosion resistance. While generally highly effective, surface treatments, including the mentioned phosphatizing, and including also galvanizing, tinning, aluminizing, sherardizing, chromizing and cladding, are not without their defects. Many are "wet" processes, that is, they are applied from solution, are readily contaminated, and provide handling and health hazards. While the state of the art treatments do improve the corrosion resistance, there is a need in many applications for greater corrosion resistance than can be provided by state of the art treatments. Additionally, it is highly desirable to develop dry treating methods which do not require the disposal of spent treating solutions.

The present invention provides a novel and unobvious method of bonding vulcanizable natural and synthetic rubbers to metal substrates to afford greater adhesion values, and, more especially, significantly improved resistance to adverse and agressive environments. More particularly, the bonding method of the present invention generally comprises treating in a non-reactive gas plasma one or more nitrided metal elements, applying an adhesive composition suitable for bonding vulcanizable natural and synthetic rubbers to metals to at least a portion of the plasma-treated nitrided metal surface(s), contacting the adhesive-coated portion(s) of such substrates, and subjecting the resulting assembly to conditions of heat and pressure for a time sufficient to effect vulcanization of the rubber composition and curing of the adhesive composition.

Nitrided substrates which are essential to the practice of the invention are well-known articles of commerce and need not be discussed here in great detail. Nitriding is a well-known metallurgical process for case-hardening metals, and any method, such as gas nitriding, solution nitriding, plasma nitriding, carbonitriding and cyanitriding can be utilized to provide nitrided ferrous-based metal elements or substrate for use in the invention. Gas nitriding and plasma nitriding processes are currently preferred. Although all exterior surfaces of the metal element(s) can be nitrided, it is essential to the practice of the invention that at least those portions of such metal substrates to which the natural and synthetic rubber compositions will be bonded be nitrided.

Substantially any material having at least one surface which has been case-hardened by nitriding can be treated in accordance with the invention. Nitrided metal substrates are preferred, particularly nitrided ferrous-based substrates, and especially iron and iron alloys, such as stainless steel and other alloy steels containing aluminum, chromium, molybdenum, vanadium or tungsten in solid solution.

Nitrided metal substrates are prepared for bonding to vulcanizable natural and synthetic rubbers in accordance with this invention by a treatment comprising exposing at least the nitrided portion of such metals, which portion is to be bonded subsequently, in a zone of electrical glow discharge plasma to a gaseous medium consisting essentially of at least one non-reactive gas. It is critical that the entire portion of the nitrided metal which is to be bonded be entirely within the visible plasma. The plasma can be produced by any conventionally available means, such as a radio frequency discharge, a microwave discharge or with electrodes. Suitable plasmas can be formed with a radio frequency discharge operated between 0 to 100 megahertz and 1 to 200 watts or with a microwave discharge operated between 500 to 4000 megahertz and 50 to 400 watts. The wattage considerations are based on a ten inch diameter reactor and will vary with reactor size. The treating period within the visible plasma zone is generally from 10 minutes to 20 hours, preferably 30 minutes to 75 minutes, although treating times outside these limits is often advantageous.

Suitable plasmas for use in the practice of the invention are obtained by the ionization of substantially non-reactive, that is, the gaseous ions are substantially non-reactive with the nitrided surface, inert ionizable gases, such as helium, nitrogen, neon, argon, krypton, and xenon, with argon being currently preferred.

The non-reactive gas plasma-treated nitrided metal substrates are readily bonded to vulcanizable natural and synthetic rubbers employing any adhesive composition which is known to be suitable for bonding vulcanizable natural and synthetic rubbers to ferrous-based metals. Suitable adhesive compositions include both one-coat and two-coat systems, as these terms are interpreted in the adhesive arts, and are so well known as to require no detailed discussion. Exemplary rubber-to-metal adhesive systems are disclosed in Coleman et al. U.S. Pat. No. 3,258,388.

Vulcanizable rubbers which can be bonded in accordance with this invention include, without limitation, natural rubber, polychloroprene rubber, styrene/butadiene rubber, ethylene/propylene copolymer rubber (EPM), ethylene/propylene/diene terpolymer rubber (EPDM), butyl rubber and polyurethane rubber.

The adhesive compositions are applied to the plasma-treated nitrided metal substrates over the area exposed to the non-reactive gas plasma in a conventional manner, such as by dipping, spraying, and brushing. Preferably, the applied adhesive film, whether comprising a single-coat adhesive composition or a two-or-more-coat adhesive composition, is allowed to dry before being contacted with the vulcanizable rubber composition. Subsequent to forming the rubber-metal assembly, with the adhesive disposed between the rubber and metal, the assembly is cured by heating in accordance with conventional practices. The exact conditions will depend on the particular elastomer being bonded and the adhesive system which is employed, and will generally be at a temperature in the range from 140° C. to 200° C. for from 5 to 75 minutes.

This invention will be more fully described with reference to FIG. 1, which is a schematic diagram of an apparatus which can be employed in the practice of the invention.

As shown in FIG. 1, there is provided non-reactive gas (argon) reservoir with conduit means 11 to deliver such gas to reactor 2. A flowmeter 3 is provided for measuring gas flow rates and a vacuum gauge 4 is provided in conduit 12 to monitor the pressure within the reactor system. Valves 21, 22 and 23 are provided in conduits 11 and 12 to regulate the flow of non-reactive gas to reactor 3. Prior to use, reactor 2 is evacuated by opening valve 24 to vacuum source 6. A suitable helical coil 7 is connected to a suitable radio frequency oscillator 8, which is operated at a frequency from 3 MHz to 100 MHz, preferably from 10 MHz to 30 MHz. Nitrided metal substrates to be treated in accordance with the invention are placed on a suitable holder (not shown) and disposed within reactor 2. The bond surface area must not only be nitrided but must also be located entirely within the visible plasma region. The reactor system also includes a trap 5 and vent conduit 14 with its valve 25.

Low carbon cold-rolled steel substrates were processed in preparation for bonding to natural rubber as follows:

Preparation A: Substrates were solvent degreased and mechanically grit-blasted.

Preparation B: Substrates were solvent degreased, mechanically grit-blasted, and gas nitrided for 43 hours at 524° C., using dissociated ammonia techniques.

Preparation C: Substrates were initially solvent degreased, mechanically grit-blasted, and gas nitrided for 43 hours at 524° C., using dissociated ammonia technique. The substrates were placed in a reactor system of the general arrangement shown in FIG. 1 with all of the substrates being located within the boundaries defined by the helical coil. The reaction chamber was evacuated to a pressure 50 microns of Hg and then a flow of argon gas was initiated and maintained at 1000 microns of Hg pressure. A radio frequency plasma was induced with activation by means of a tesla coil. The substrates were exposed to the argon glow discharge plasms for 60 minutes at 50 watts radio frequency power and 1.0–1.5 Torr pressure.

All metal parts from Preparations A, B and C were dipped in a metal primer adhesive containing heat-reactive phenolic resin, dried in air and the dipped in a halogenated rubber containing rubber-to-metal adhesive. The thus-coated metal parts were bonded to unvulcanized natural rubber stock. The assemblies were cured at 154° C. for 20 minutes.

The results of the bonding tests are shown in Table I. The bonded assemblies were tested before and after 30 day exposure to salt spray, with the tests being performed according to the procedure of ASTM D429, Method B, 45° angle pull. The results clearly demonstrate the significant improvement in adhesion and environmental protection, especially the latter, which the present invention provides, in comparison to metal parts treated in accordance with Preparations A and B.

TABLE I

| Preparation | Adhesion | | | |
| --- | --- | --- | --- | --- |
| | Before Salt Spray Exposure | | After 30 Day Salt Spray Exposure | |
| | Pull, pli | Failure | Pull, pli | Failure |
| A | 64 | 100R | 49 | 50R |
| B | 72 | 100R | 63 | 90R |
| C | 109 | 100R | 103 | 99.9R |

What is claimed is:

1. A method for improving environmental resistance of rubber-metal composite structures comprising:
   (a) treating in a plasma of at least one non-reactive gas at least one nitrided metal element;
   (b) applying to at least one plasma-treated surface of said nitrided metal element an adhesive composition suitable for bonding natural and synthetic rubbers to metal;
   (c) contacting such adhesively-coated surface of such elements with a vulcanizable natural or synthetic rubber;
   (d) subjecting the resultant assembly to conditions sufficient to vulcanize said rubber and cure said adhesive.

2. A method according to claim 1 wherein said non-reactive gas is selected from the group consisting of helium, nitrogen, neon, argon, krypton and xenon.

3. A method according to claim 1 wherein said metal is a ferrous-based metal.

4. A method according to claim 3 wherein said non-reactive gas is selected from the group consisting of helium, nitrogen, neon, argon, krypton and xenon.

5. A method according to claim 4 wherein said ferrous-based metal is selected from the group consisting of iron and alloys of iron.

6. A method according to claim 1 for improving environmental resistance of rubber-metal composite structures comprising:
   (a) providing a nitrided metal substrate;
   (b) treating said nitrided substrate in a zone of electrical glow discharge plasma in a gaseous medium consisting essentially of at least one non-reactive gas, whereby at least a portion of at least one nitrided surface of such metal substrate is exposed to such plasma;
   (c) applying to at least a part of the plasma-treated portion of such metal substrate an adhesive composition suitable for bonding natural and synthetic rubber compositions to metal substrates;
   (d) contacting such adhesive-coated part of such metal substrate with a vulcanizable rubber composition; and
   (e) subjecting the resulting assembly to vulcanization conditions at a pressure, temperature and time sufficient to cure such adhesive and vulcanizable rubber composition.

7. A method according to claim 6 wherein said non-reactive gas is selected from the group consisting of helium, nitrogen, neon, argon, krypton and xenon.

8. A method according to claim 6 wherein said metal is a ferrous-based metal.

9. A method according to claim 8 wherein said non-reactive gas is selected from the group consisting of helium, nitrogen, neon, argon, krypton and xenon.

10. A method according to claim 9 wherein said ferrous-based metal is selected from the group consisting of iron and iron alloys.

* * * * *